May 26, 1931.  H. A. CLARK  1,807,568
OIL SEAL
Filed July 9, 1928
Fig. 1
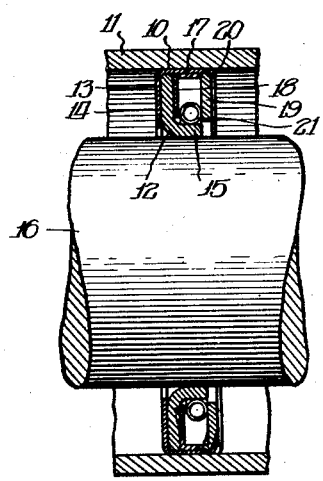
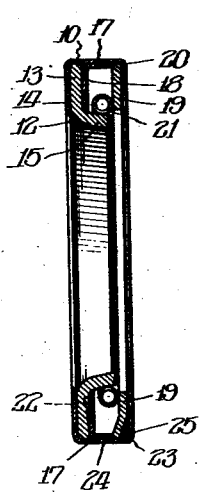
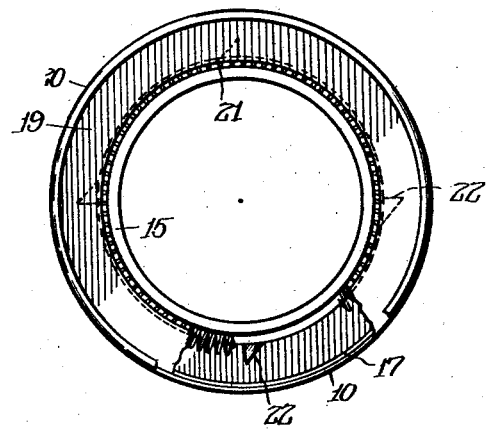
Fig. 2.   Fig. 3.
Inventor:
Harold A. Clark,
By Cromwell, Greist & Warden
attys Patented May 26, 1931

1,807,568

UNITED STATES PATENT OFFICE

HAROLD A. CLARK, OF NORTHBROOK, ILLINOIS, ASSIGNOR TO CHICAGO RAWHIDE MANUFACTURING CO., OF CHICAGO, ILLINOIS, A CORPORATION OF ILLINOIS

OIL SEAL

Application filed July 9, 1928. Serial No. 291,165.

This invention is concerned with oil seals of the type disclosed in my copending application Serial No. 288,093.

The primary object of the invention is to provide a stationary, as distinguished from floating, seal which will function efficiently and is extremely inexpensive to construct.

Other objects and advantages will be apparent to those skilled in the art upon a full understanding of the construction, arrangement and operation of the seal.

One form of the invention is presented herein for the purpose of exemplification, but it will of course be understood that the invention is capable of embodiment in other forms coming equally within the scope of the appended claims.

In the accompanying drawings:

Fig. 1 is a diametric section through the seal, showing the same positioned within a housing about a rotating shaft;

Fig. 2 is another diametric section, showing the seal prior to application; and

Fig. 3 is an end view, with portions broken away to show the interior.

The seal illustrated in the drawings consists of a centrally apertured cup-shaped cage 10 which is adapted to be positioned in fluid-tight association with a housing 11, a packing 12 having a radially flanged portion 13 in fluid-tight association with the bottom 14 of the cage and an axially sleeved portion 15 which is adapted to be positioned in rotatable fluid-tight association with a shaft 16 passing through the same, a cup-shaped ring 17 nested within the cage with the bottom 18 of the ring clamped against the radially flanged portion 13 of the packing, a washer 19 held by a spun-over edge 20 of the cage in clamped engagement with the ring, and a coil spring 21 extending under tension about the axially sleeved portion 15 of the packing.

The packing is made of leather or other suitable material, and, by reason of the simple arrangement described, the radially flanged portion of the packing is securely clamped between the bottom of the cage and the bottom of the ring throughout substantially its entire radial extent.

The packing is prevented from rotating with the shaft by means of spur-like projections 22 on the bottom of the spacing ring, which projections are embedded in the opposed face of the packing. The ring is preventing from turning with respect to the washer by means of a tongue 23 on the washer which is deflected laterally into a notch 24 in the rim of the ring; and the washer is prevented from turning with respect to the cage by an indention 25 in the spun-over edge of the cage at the location of the recess formed by the deflection of the tongue 23.

I claim:

1. As an article of manufacture, a self-contained seal for insertion as an assembled unit within a tubular housing in encompassing relation to a centrally located shaft, consisting of a cup-shaped cage, a cup-shaped ring of substantially the same outside diameter as the inside of the cage nested within the cage, a radially flanged packing also of substantially the same outside diameter as the inside of the cage postioned in the cage with the radially extending portion of the packing clamped immovably between the bottom of the cage and the bottom of the ring, and a washer secured between the rim of the cage and the rim of the ring.

2. As an article of manufacture, a self-contained seal for insertion as an assembled unit within a tubular housing in encompassing relation to a centrally located shaft, consisting of a cup-shaped cage, a cup-shaped ring nested within the cage, a radially flanged packing of substantially the same outside diameter as the inside of the cage positioned in the cage with the radially extending portion of the packing clamped immovably between the bottom of the cage and the bottom of the ring, and a washer secured between the rim of the cage and the rim of the ring.

In testimony whereof I have hereunto subscribed my name.

HAROLD A. CLARK.